(12) United States Patent
Lin et al.

(10) Patent No.: US 8,462,137 B2
(45) Date of Patent: Jun. 11, 2013

(54) OBJECT DETECTION CALIBRATION SYSTEM OF AN OPTICAL TOUCH SCREEN AND METHOD THEREOF

(75) Inventors: Chih-Hsin Lin, Hsin-Chu (TW); Tzung-Min Su, Hsin-Chu (TW); Cho-Yi Lin, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 495 days.

(21) Appl. No.: 12/826,612

(22) Filed: Jun. 29, 2010

(65) Prior Publication Data

US 2010/0328270 A1    Dec. 30, 2010

Related U.S. Application Data

(60) Provisional application No. 61/221,565, filed on Jun. 30, 2009.

(51) Int. Cl.
 *G06F 3/042* (2006.01)
(52) U.S. Cl.
 USPC .......................................... 345/175; 345/173
(58) Field of Classification Search
 USPC ................................................. 345/173, 175
 See application file for complete search history.

(56) References Cited

U.S. PATENT DOCUMENTS

| 5,764,223 A * | 6/1998 | Chang et al. ................... 345/175 |
| 6,674,424 B1 | 1/2004 | Fujioka |
| 7,256,772 B2 * | 8/2007 | Morrison ....................... 345/178 |
| 7,492,357 B2 | 2/2009 | Morrison |
| 2004/0201575 A1 * | 10/2004 | Morrison ....................... 345/173 |
| 2005/0248539 A1 | 11/2005 | Morrison |
| 2009/0141002 A1 * | 6/2009 | Sohn et al. ..................... 345/175 |
| 2010/0194711 A1 * | 8/2010 | Tsai et al. ...................... 345/175 |

FOREIGN PATENT DOCUMENTS

| CN | 101019096 A | 8/2007 |
| CN | 101101509 A | 1/2008 |
| CN | 101169831 A | 4/2008 |
| TW | 200925964 | 6/2009 |
| TW | M358363 | 6/2009 |

* cited by examiner

*Primary Examiner* — Latanya Bibbins
(74) *Attorney, Agent, or Firm* — Winston Hsu; Scott Margo (57) ABSTRACT

A first image sensor captures a first image of a panel of a touch screen. The first image includes a first object, a second object, a first set of reference marks, a second set of reference marks, and a first boundary mark. The touch screen establishes relationships of relative positions among the first image sensor, the first object, the second object, and the reference marks according to positions of the first object, the second object, and the reference marks in the first image. And the touch screen calculates a relative position between the first image sensor and the panel according to the relationships of relative positions among the first image sensor, the first object, the second object, and the reference marks and relative positions among the first object, the second object, and the panel.

11 Claims, 8 Drawing Sheets

OBJECT DETECTION CALIBRATION SYSTEM OF AN OPTICAL TOUCH SCREEN AND METHOD THEREOF

CROSS REFERENCE TO RELATED APPLICATIONS

This application claims the benefit of U.S. Provisional Application No. 61/221,565, filed on Jun. 30, 2009 and entitled "COORDINATE DETECTION OF TOUCH SYSTEM," the contents of which are incorporated herein by reference.

BACKGROUND OF THE INVENTION

1. Field of the Invention

The present invention relates to an object detection system of an optical touch screen and related method, and more particularly to an object detection system of an optical touch screen and related method for locating position of an image sensor according to a plurality of reference marks at known points and a plurality of calibration marks at known points.

2. Description of the Prior Art

Optical touch screen object detection systems utilize light sources to project light toward a control panel of a touch screen, then utilize at least one image sensor to capture an image. When an object contacts the control panel, distance between the object and one image sensor is determined according to at least one image comprising the object captured by the at least one image sensor for locating position of the object on the control panel.

However, when the image sensor is installed at a fixed position relative to the control panel, the image sensor is not accurately positioned at the fixed position, causing error when utilizing the image sensor to locate position of the object on the control panel. This affects practical operation of the optical touch screen.

SUMMARY OF THE INVENTION

According to an embodiment, an object detection calibration system comprises a touch screen and an auxiliary reference device. The touch screen comprises a control panel comprising a first side, a second side, a third side, and a fourth side, and at least one first image sensor positioned at a corner region joining the first side and the second side. The auxiliary reference device comprises a plurality of reference marks comprising at least a first set of reference marks, a second set of reference marks, and a first boundary mark. The first set of reference marks is positioned on the third side, the second set of reference marks is positioned on the fourth side, and the first boundary mark is positioned at a corner region joining the third side and the first side. The first image sensor is utilized for capturing a first image of at least a first object and the plurality of reference marks, and the touch screen determines relative position relationships between the first image sensor, the first object, and the plurality of reference marks according to positions of the first object and the plurality of reference marks in the first image.

According to another embodiment, a method of performing object detection calibration for a touch screen comprises a first image sensor capturing a first image of a first object, a second object, and a plurality of reference points comprising a first set of reference marks, a second set of reference marks, and a first boundary mark; the touch screen determining relative position relationships of the first image sensor, the first object, the second object, and the plurality of reference points according to position of the first object and the second object in the first image and position of the plurality of reference marks in the first image; and the touch screen calculating relative position relationship of the first image and the control panel according to the relative position relationships of the first image sensor, the first object, the second object, and the plurality of reference marks, and positions of the first object and the second object relative to the control panel. The positions of the first object and the second object relative to the control panel are known.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
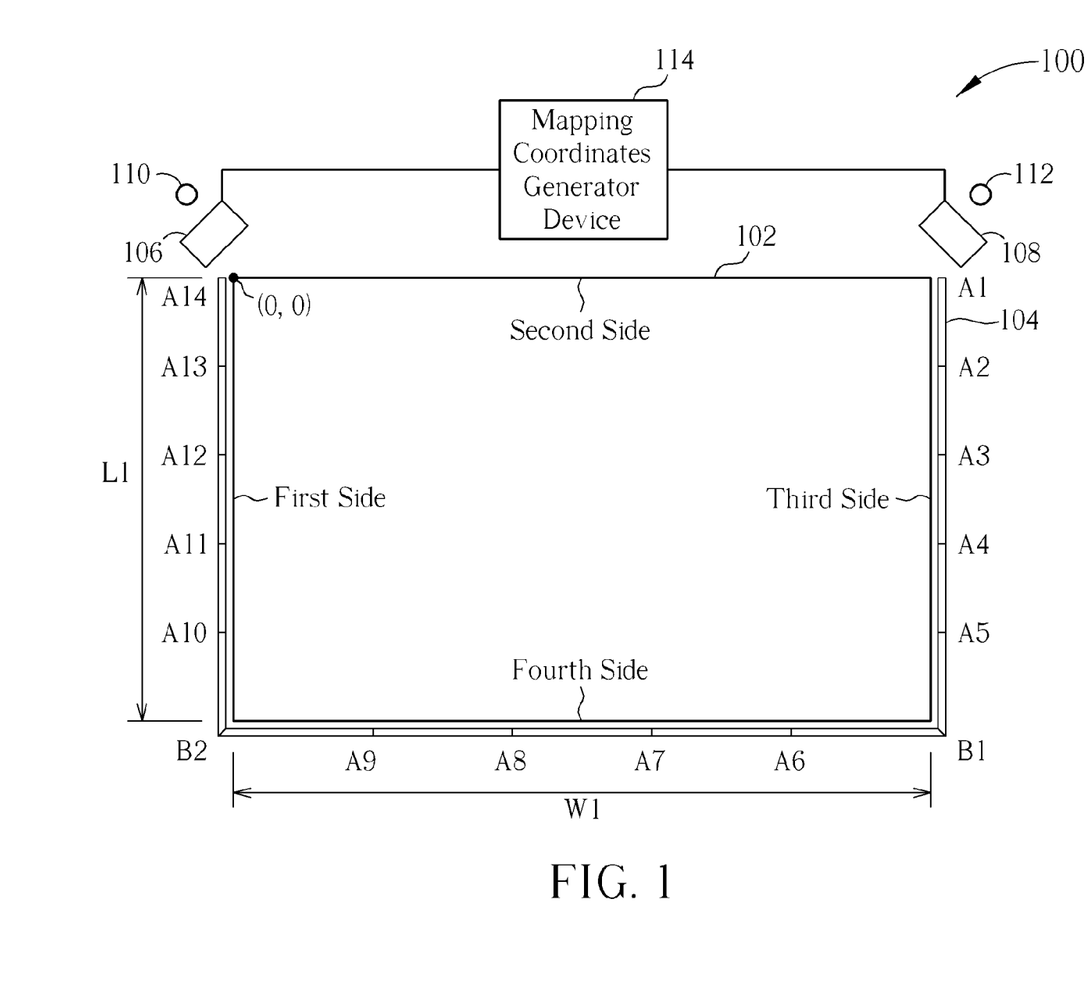
FIG. 1 is a diagram of an object detection calibration system according to an embodiment of the present invention.

Please refer to FIG. 1. FIG. 1 is a diagram of an object detection calibration system 100 according to an embodiment of the present invention. The object detection calibration system 100 comprises a control panel 102, an auxiliary reference device 104, a first image sensor 106, a second image sensor 108, a first projection light source 110, a second projection light source 112, and an mapping coordinates generator device 114. The auxiliary reference device comprises a plurality of reference marks comprising a first set of reference marks (A1-A5), a second set of reference marks (A6-A9), a third set of reference marks (A10-A14), a first boundary mark B1, and a second boundary mark B2. The mapping coordinates generator device 114 is coupled to the first image sensor 106 and the second image sensor 108. The first set of reference marks (A1-A5) is positioned on a third side of the control panel 102. The second set of reference marks (A6-A9) is positioned on a fourth side of the control panel 102. The third set of reference marks (A10-A14) is positioned on a first side of the control panel 102. The first boundary mark B1 is positioned at a corner region joining the third side and the fourth side of the control panel 102. The second boundary mark B2 is positioned at a corner region joining the first side and the fourth side of the control panel 102. Number of reference marks is not limited in the auxiliary reference device 104. The first projection light source 110 and the second projection light source 112 are utilized for lighting the control panel 102.

Figure 2:
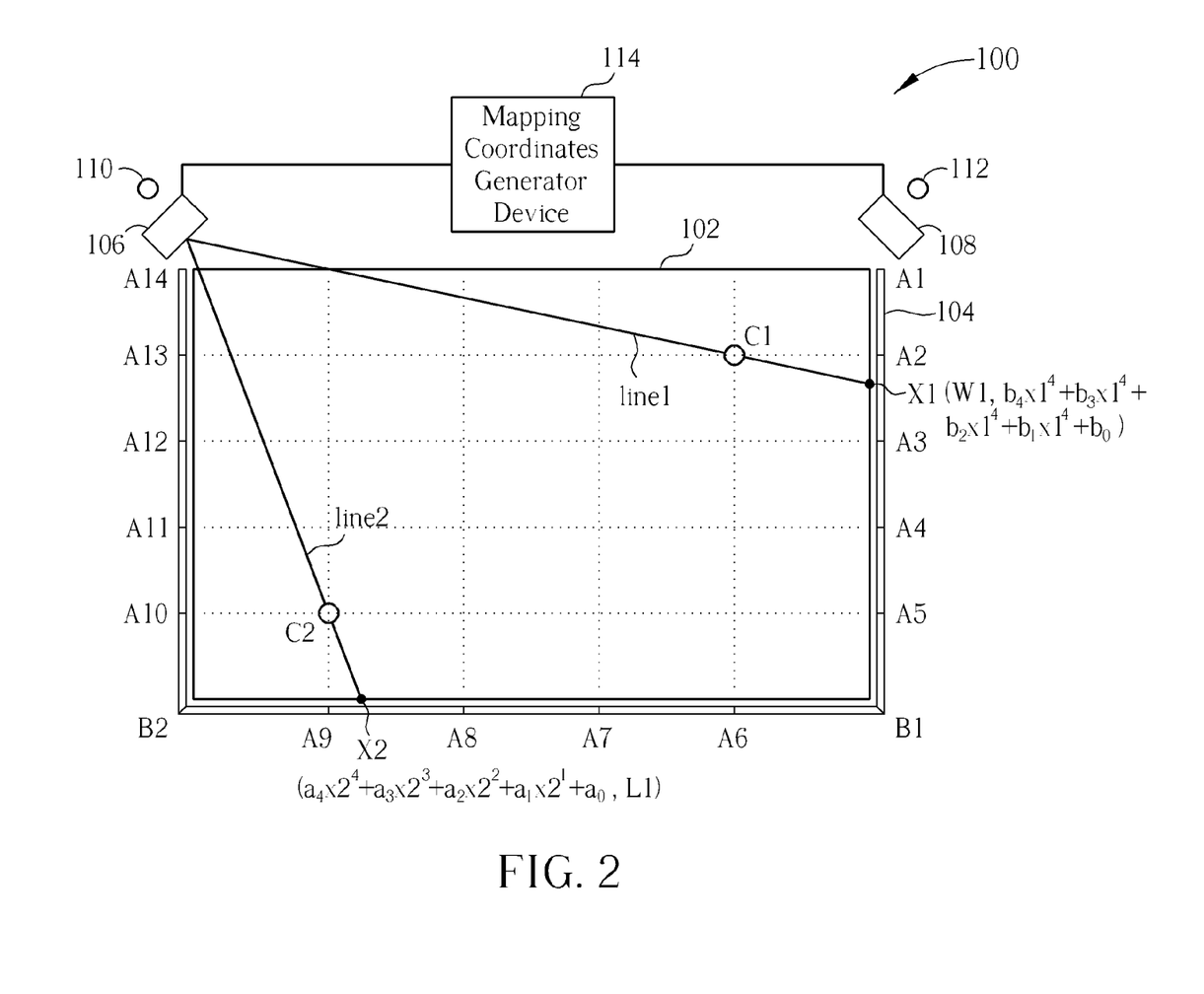
FIG. 2 is a diagram of utilizing known calibration points to calibrate position of the first image sensor.
Figure 3:
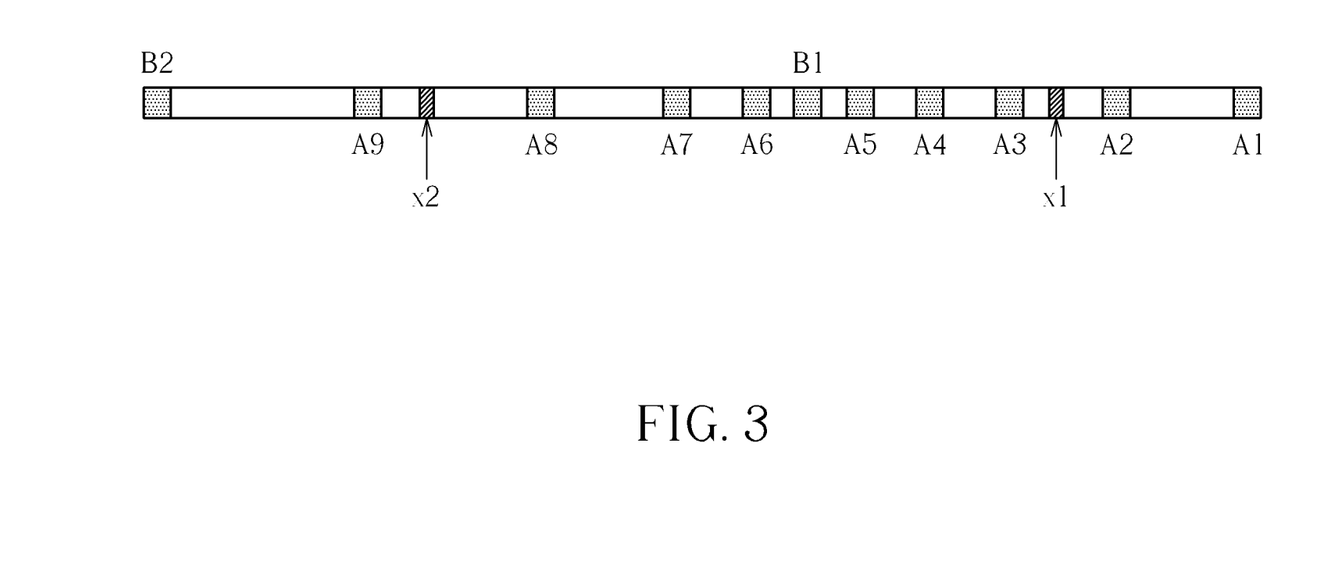
FIG. 3 is a diagram illustrating obstruction points of the known calibration points in a first image captured by the first image sensor, and position of the auxiliary reference device in the first image captured by the first image sensor.

Please refer to FIG. 2 and FIG. 3. FIG. 2 is a diagram of utilizing known calibration points to calibrate position of the first image sensor 106. FIG. 3 is a diagram illustrating obstruction points of the known calibration points in a first image captured by the first image sensor 106, and position of the auxiliary reference device 104 in the first image captured by the first image sensor 106. As shown in FIG. 2, an obstruction point at coordinates X1 caused by a first calibration point C1 is between reference marks A2, A3 of the auxiliary reference device 104, and an obstruction point at coordinates X2 caused by a second calibration point C2 is between reference marks A8, A9 of the auxiliary reference device 104. Thus, as shown in FIG. 3, the obstruction point at the coordinates X1 caused by the first calibration point C1 and the obstruction point at the coordinates X2 caused by the second calibration point C2 are located at position x1 (between positions of reference marks A2, A3 in the first image) and position x2 (between positions of reference marks A8, A9 in the first image), respectively.

However, as shown in FIG. 3, positions x1, x2 are one-dimensional coordinates. Thus, the mapping coordinates generator device 114 is utilized to convert the positions x1, x2 into two-dimensional mapping coordinates X1, X2 of the first image sensor 106 relative to the control panel 102. The mapping coordinates generator device 114 converts the positions x1, x2 to the mapping coordinates X1, X2 according to the following equations:

$$X = a_4 x^4 + a_3 x^3 + a_2 x^2 + a_1 x^1 + a_0 \quad (1)$$

$$Y = b_4 x^4 + b_3 x^3 + b_2 x^2 + b_1 x^1 + b_0 \quad (2)$$

where $a_0$-$a_4$, $b_0$-$b_4$ are coordinate conversion constants that may be calculated from a plurality of known reference marks of the auxiliary reference device 104. Equations (1), (2) are not limited to fourth-degree polynomials. The x-coordinate of the obstruction point at the coordinates X1 is equal to width W1 of the control panel 102, because x-coordinates of the first set of reference marks (A1-A5) represent the width W1 of the control panel 102. Only the y-coordinate of the obstruction point at the coordinates X1 is unknown. Thus, the y-coordinate of the obstruction point at the coordinates X1 may be obtained by substituting x1 into equation (2). Coordinates of the obstruction point x1 at the mapping coordinates X1 relative to the first image sensor 106 may be expressed as:

$$(W1, b_4 x1^4 + b_3 x1^3 + b_2 x1^2 + b_1 x1 + b_0) \quad (3)$$

Further, because the y-coordinates of the second set of reference marks (A6-A9) represent length L1 of the control panel 102, the y-coordinate of the obstruction point at the mapping coordinates X2 is also equal to the length L1. Only the x-coordinate of the obstruction point at the mapping coordinates X2 is unknown. The x-coordinate of the obstruction point at the mapping coordinates X2 may be obtained by substituting x2 into equation (1). Thus, the image coordinates of the obstruction point at the mapping coordinates X2 relative to the first image sensor 106 may be expressed as:

$$(a_4 x2^4 + a_3 x2^3 + a_2 x2^2 + a_1 x2^1 + a_0, L1) \quad (4)$$

Because the first calibration point C1 and the second calibration point C2 are calibration points with known coordinates, and mapping coordinates X1, X2 relative to the first image sensor 106 of the obstruction points at positions x1, x2 caused by the first calibration point C1 and the second calibration point C2 are known, a first line line1 may be determined from the first calibration point C1 and the mapping coordinates X1, and a second line line2 may be determined from the second calibration point C2 and the mapping coordinates X2. Coordinates of the first image sensor 106 are coordinates of intersection between the first line line1 and the second line line2. Calibration of coordinates of the second image sensor 108 may be achieved through a similar process, and description thereof is not repeated herein. Further, calibration of the coordinates of the first image sensor 106 and calibration of the coordinates of the second image sensor 108 are not limited to using two calibration points. More than two calibration points may be utilized to calibrate the coordinates of the first image sensor 106 and the coordinates of the second image sensor 108.

Figure 4:
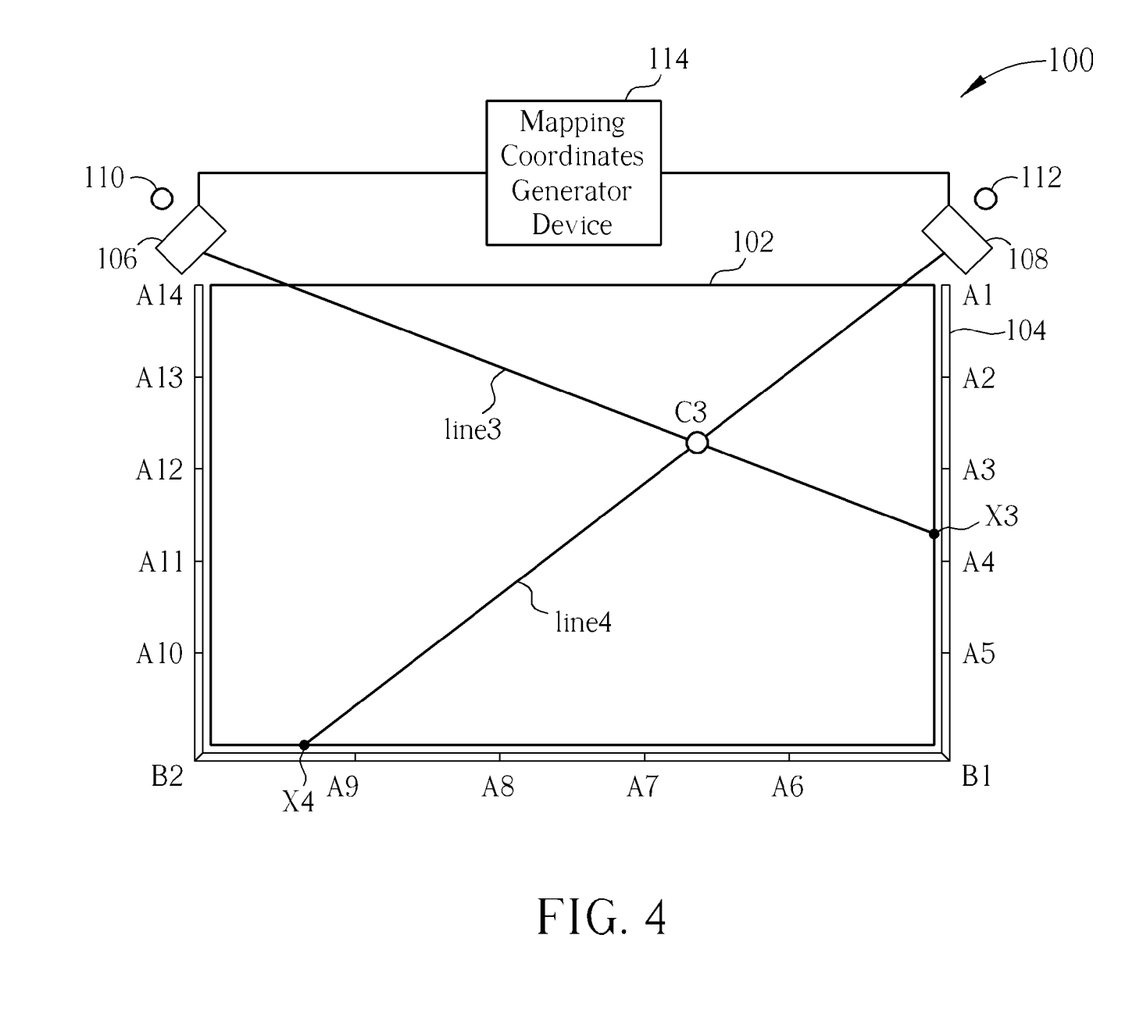
FIG. 4 is a diagram of utilizing the object detection calibration system to determine position of a detected object.

Please refer to FIG. 4. FIG. 4 is a diagram of utilizing the object detection calibration system 100 to determine position of a detected object C3. Mapping coordinates X3, X4 corresponding to the detected object C3 may be calculated according to equations (1), (2). Then, a third line line3 from the first image sensor 106 to the mapping coordinates X3 may be determined, and a fourth line line4 from the second image sensor 108 to the mapping coordinates X4 may be determined. Coordinates of the detected object C3 are determined as coordinates of intersection of the third line line3 and the fourth line line4.

Figure 5:
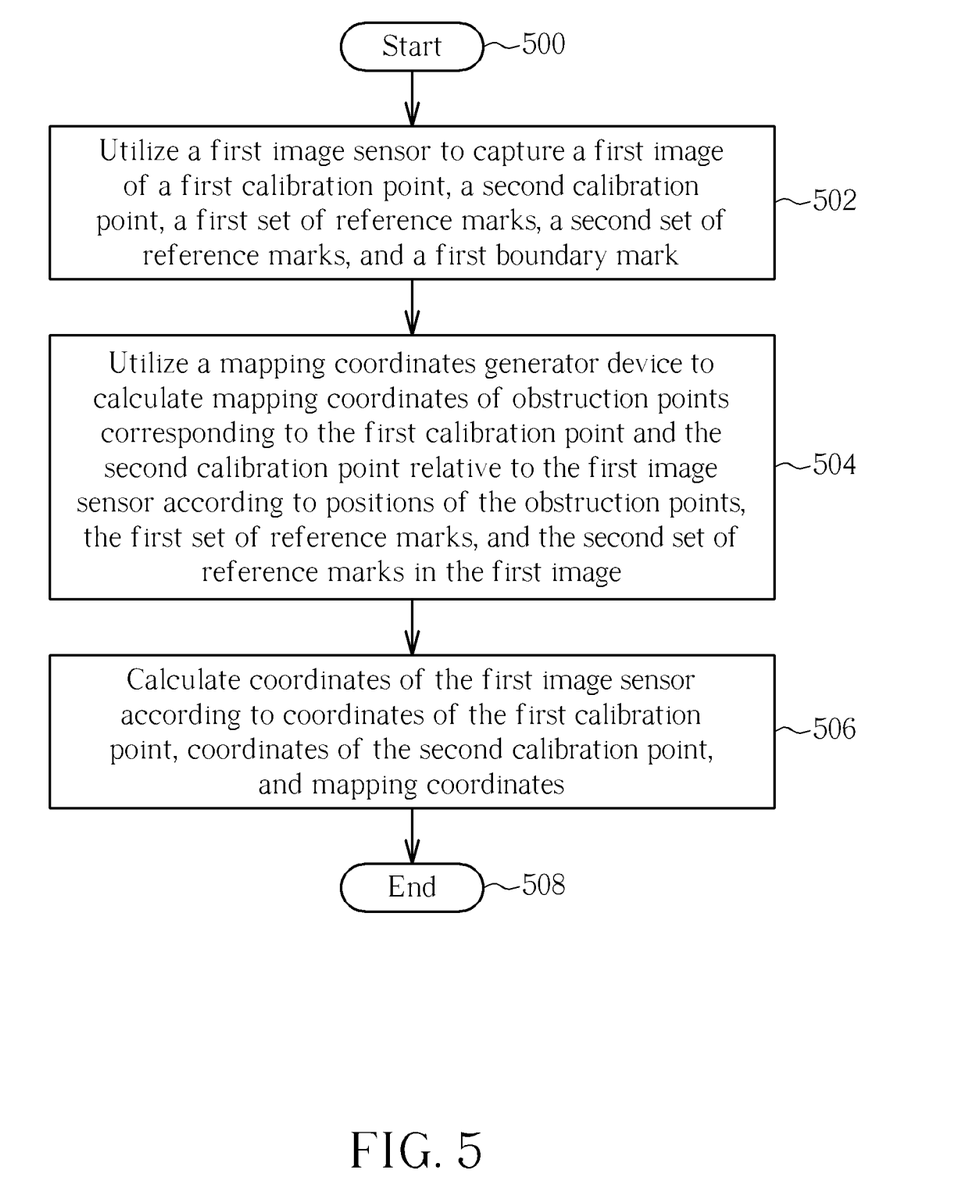
FIG. 5 is a flowchart of a method of performing image sensor calibration for a touch screen according to an embodiment of the present invention.

Please refer to FIG. 5, which is a flowchart of a method of performing image sensor calibration for a touch screen according to an embodiment of the present invention. The method shown in FIG. 5 may be performed by the object detection calibration system 100 shown in FIG. 1, and comprises:

Step 500: Start;

Step 502: Utilize a first image sensor 106 to capture a first image of a first calibration point C1, a second calibration point C2, a first set of reference marks (A1-A5), a second set of reference marks (A6-A9), and a first boundary mark B1;

Step 504: Utilize a mapping coordinates generator device 114 to calculate mapping coordinates X1, X2 of obstruction points x1, x2 corresponding to the first calibration point C1 and the second calibration point C2 relative to the first image sensor 106 according to positions of the obstruction points x1, x2, the first set of reference marks (A1-A5), and the second set of reference marks (A6-A9) in the first image;

Step 506: Calculate coordinates of the first image sensor 106 according to coordinates of the first calibration point C1, coordinates of the second calibration point C2, and mapping coordinates X1, X2; and Step 508: End.

Figure 6:
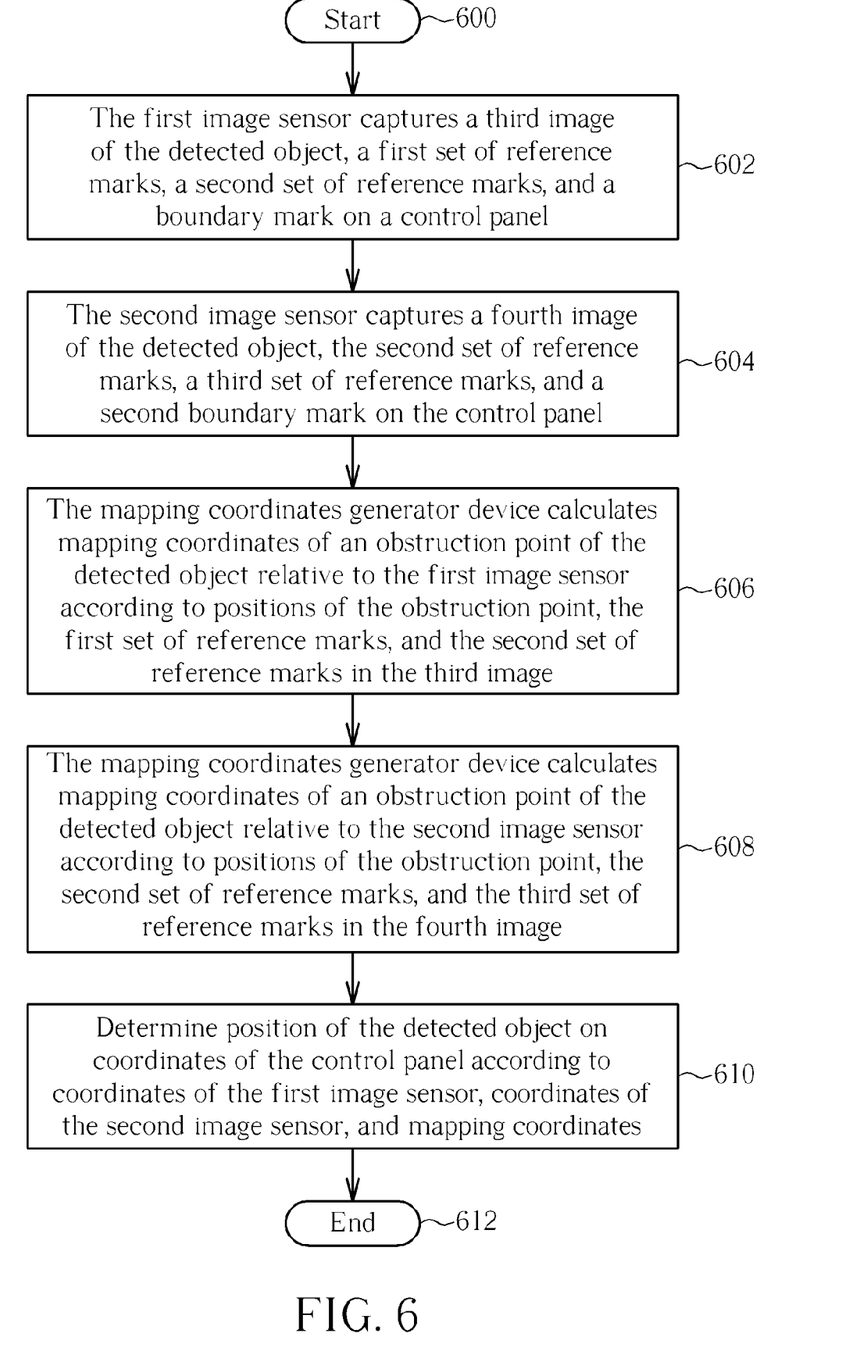
FIG. 6 is a flowchart of a method for determining position of a detected object for a touch screen according to another embodiment of the present invention.

Please refer to FIG. 6, which is a flowchart of a method for determining position of a detected object C3 for a touch screen according to another embodiment of the present invention. The method of FIG. 6 may be performed by the object detection calibration system 100 of FIG. 1, and comprises:

Step 600: Start;

Step 602: The first image sensor 106 captures a third image of the detected object C3, a first set of reference marks (A1-A5), a second set of reference marks (A6-A9), and a boundary mark B1 on a control panel 102;

Step 604: The second image sensor captures a fourth image of the detected object C3, the second set of reference marks (A6-A9), a third set of reference marks (A10-A14), and a second boundary mark B2 on the control panel;

Step 606: The mapping coordinates generator device 114 calculates mapping coordinates X3 of an obstruction point x3 of the detected object C3 relative to the first image sensor 106 according to positions of the obstruction point x3, the first set of reference marks (A1-A5), and the second set of reference marks (A6-A9) in the third image;

Step 608: The mapping coordinates generator device 114 calculates mapping coordinates X4 of an obstruction point x4 of the detected object C3 relative to the second image sensor 108 according to positions of the obstruction point x4, the second set of reference marks (A6-A9), and the third set of reference marks (A10-A14) in the fourth image;

Step 610: Determine position of the detected object C3 on coordinates of the control panel 102 according to coordinates of the first image sensor 106, coordinates of the second image sensor 108, and mapping coordinates X3, X4; and Step 612: End.

Figure 7:
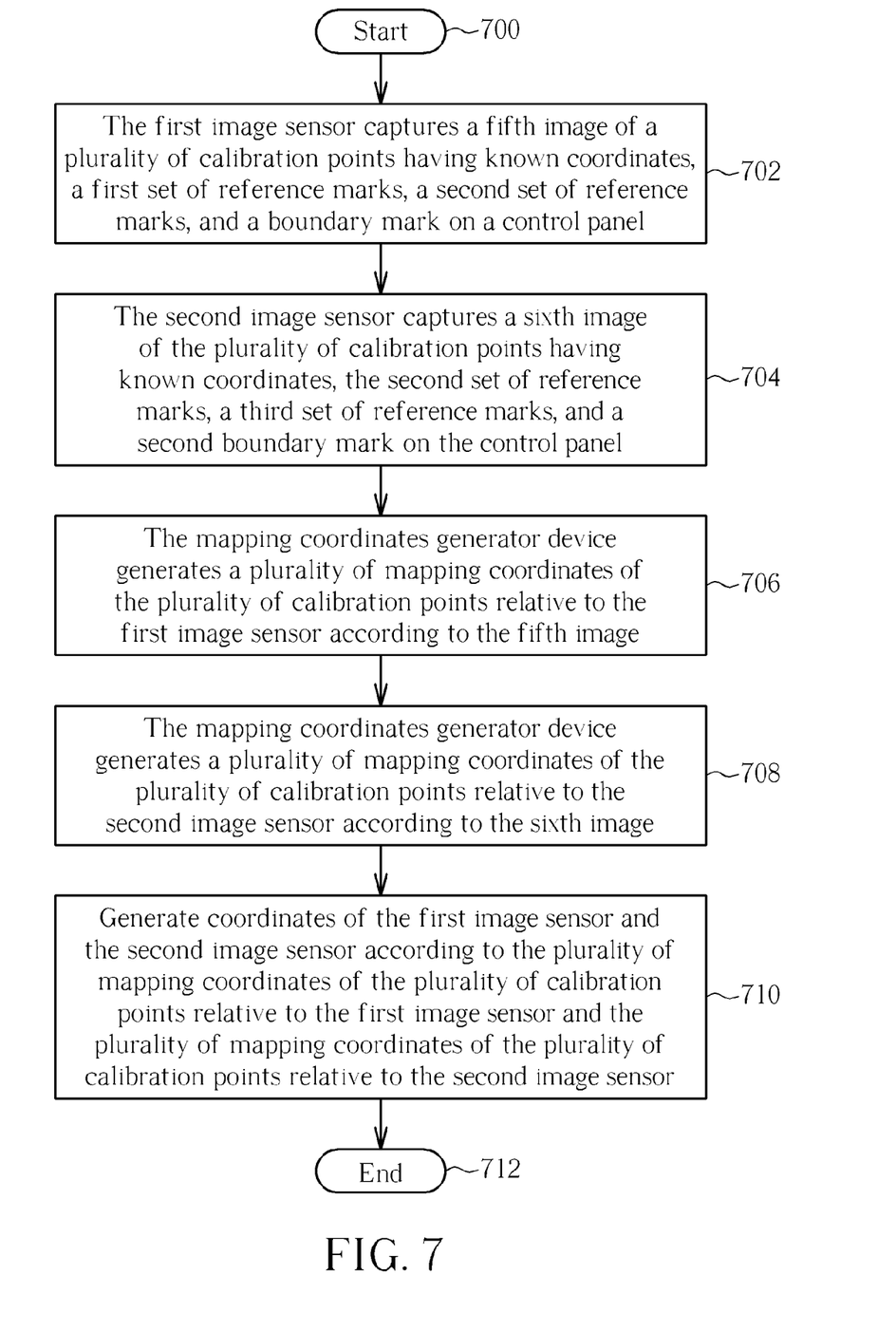
FIG. 7 is a flowchart of a method of performing image sensor calibration for a touch screen according to another embodiment of the present invention.

Please refer to FIG. 7, which is a flowchart of a method of performing image sensor calibration for a touch screen according to another embodiment of the present invention. The method of FIG. 7 may be performed by the object detection calibration system 100 of FIG. 1, and comprises:

Step 700: Start;

Step 702: The first image sensor 106 captures a fifth image of a plurality of calibration points having known coordinates, a first set of reference marks (A1-A5), a second set of reference marks (A6-A9), and a boundary mark B1 on a control panel 102;

Step 704: The second image sensor captures a sixth image of the plurality of calibration points having known coordinates, the second set of reference marks (A6-A9), a third set of reference marks (A10-A14), and a second boundary mark B2 on the control panel;

Step 706: The mapping coordinates generator device 114 generates a plurality of mapping coordinates of the plurality of calibration points relative to the first image sensor 106 according to the fifth image;

Step 708: The mapping coordinates generator device 114 generates a plurality of mapping coordinates of the plurality of calibration points relative to the second image sensor 108 according to the sixth image;

Step 710: Generate coordinates of the first image sensor 106 and the second image sensor 108 according to the plurality of mapping coordinates of the plurality of calibration points relative to the first image sensor 106 and the plurality of mapping coordinates of the plurality of calibration points relative to the second image sensor 108;

Step 712: End.

Figure 8:
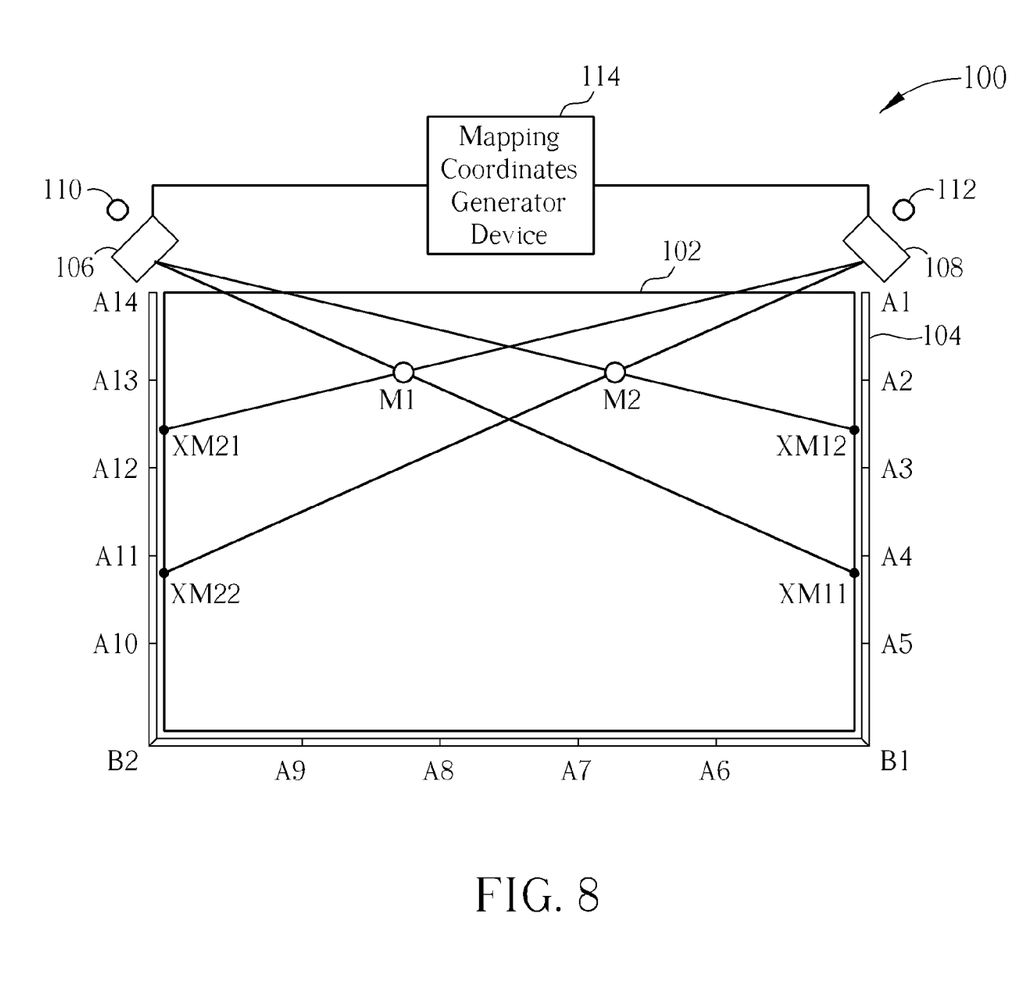
FIG. 8 is a diagram illustrating simultaneously calibrating coordinates of the first image sensor and the second image sensor through a plurality of calibration points having known coordinates.

The method of performing image sensor calibration shown in FIG. 7 simultaneously calibrates coordinates of the first image sensor 106 and the second image sensor 108 through the plurality of calibration points having known coordinates. Please refer to FIG. 8, which is a diagram illustrating simultaneously calibrating the coordinates of the first image sensor 106 and the second image sensor 108 through the plurality of calibration points having known coordinates. As shown in FIG. 8, the closer to the top of the control panel 102 the calibration points having known coordinates are located, the more accurate the result of calibrating the coordinates of the first image sensor 106 and the second image sensor 108 is. FIG. 8 only shows two calibration points M1, M2 having known coordinates, and mapping coordinates XM11, XM12, XM21, XM22 thereof relative to the first image sensor 106 and the second image sensor 108, respectively. However, number of calibration points having known coordinates is not limited to two for simultaneously calibrating the coordinates of the first image sensor 106 and the second image sensor 108.

An object detection calibration system and related methods are provided. The mapping coordinates generator device generates the mapping coordinates relative to the image sensor(s) according to the positions of the obstruction points corresponding to the known calibration points in the image captured by the image sensor, and the positions of the plurality of reference marks having known positions in the image captured by the image sensor. Then, the coordinates of the image sensor(s) are calibrated according to the known calibration points and the mapping coordinates. After calibrating the coordinates of the image sensor(s), the image sensor(s) may be utilized to accurately determine positions of detected objects on the control panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object detection calibration system comprising:
    a touch screen comprising:
        a control panel comprising a first side, a second side, a third side, and a fourth side; and
        at least one first image sensor positioned at a corner region joining the first side and the second side; and
    an auxiliary reference device comprising a plurality of reference marks comprising at least a first set of reference marks, a second set of reference marks, and a first boundary mark, wherein the first set of reference marks is positioned on the third side, the second set of reference marks is positioned on the fourth side, and the first boundary mark is positioned at a corner region joining the third side and the fourth side;
    wherein the first image sensor is utilized for capturing a first image of at least a first object and the plurality of reference marks, and the touch screen determines relative position relationships between the first image sensor, the first object, and the plurality of reference marks according to positions of the first object and the plurality of reference marks in the first image.

2. The object detection calibration system of claim 1, wherein the first image captured by the first image sensor is further of a second object, positions of the first object and the second object relative to the control panel are known, the touch screen determines relative position relationships between the first image sensor, the first object, the second object, and the plurality of reference marks according to positions of the first object, the second object, and the plurality of reference marks in the first image, and the touch screen calculates relative position relationship between the first image sensor and the control panel according to the relative position relationships between the first image sensor, the first object, the second object, and the plurality of reference marks and the relative positions of the first object, the second object, and the control panel.

3. The object detection calibration system of claim 1, wherein the touch screen further comprises a second image sensor positioned at a corner region of the control panel joining the second side to the third side, the plurality of reference marks of the auxiliary reference device further comprises a third set of reference marks positioned on the first side, and a second boundary mark positioned at a corner region joining the fourth side to the first side, wherein the second image sensor is utilized for capturing a second image of the first object and the plurality of reference marks, and the touch screen determines relative position relationships of the second image sensor, the first object, and the plurality of reference marks according to positions of the first object and the plurality of reference marks in the second image.

4. The object detection calibration system of claim 1, further comprising at least one projected light source for lighting the control panel.

5. The object detection calibration system of claim 3, further comprising an image coordinates generator device for generating image coordinates of the first object relative to the first image sensor and image coordinates of the second image sensor according to positions of the first object in the first image and the second image.

6. The object detection calibration system of claim 5, wherein the touch screen locates coordinates of the first object on the control panel according to image coordinates of the first object relative to the first image sensor and the second image sensor, image coordinates of the first image sensor, and image coordinates of the second image sensor.

7. A method of performing object detection calibration for a touch screen, the method comprising:
- a first image sensor capturing a first image of a first object, a second object, and a plurality of reference points comprising a first set of reference marks, a second set of reference marks, and a first boundary mark;
- the touch screen determining relative position relationships of the first image sensor, the first object, the second object, and the plurality of reference points according to position of the first object and the second object in the first image and position of the plurality of reference marks in the first image; and
- the touch screen calculating relative position relationship of the first image and the control panel according to the relative position relationships of the first image sensor, the first object, the second object, and the plurality of reference marks, and positions of the first object and the second object relative to the control panel;
- wherein the positions of the first object and the second object relative to the control panel are known.

8. The method of claim 7, further comprising:
- a second image sensor capturing a second image of the first object, the second set of reference marks, a third set of reference marks, and a second boundary mark on the control panel; and
- the touch screen determining relative position relationships of the second image sensor, the first object, and the plurality of reference marks according to positions of the first object and the plurality of reference marks in the second image.

9. The method of claim 8, further comprising:
- an image coordinates generator device generating image coordinates of the first object relative to the first image sensor and image coordinates of the second image sensor according to positions of the first object in the first image and the second image.

10. The method of claim 9, further comprising:
- the touch screen locating coordinates of the first object on the control panel according to image coordinates of the first object relative to the first image sensor and the second image sensor, image coordinates of the first image sensor, and image coordinates of the second image sensor.

11. The method of claim 8, further comprising:
- the first image sensor capturing a third image of a plurality of objects, the first set of reference marks, the second set of reference marks, and the first boundary mark on the control panel;
- the second image sensor capturing a fourth image of the plurality of objects, the second set of reference marks, the third set of reference marks, and the second boundary mark on the control panel;
- the touch screen determining relative position relationships of the first image sensor, the plurality of objects, and the plurality of reference marks according to positions of the plurality of objects and the plurality of reference marks in the third image;
- the touch screen determining relative position relationships of the second image sensor, the plurality of objects, and the plurality of reference marks according to positions of the plurality of objects and the plurality of reference marks in the fourth image; and
- the touch screen calculating relative position relationships of the first image sensor, the second image sensor, and the control panel according to the relative position relationships of the first image sensor, the second image sensor, the plurality of objects, and the plurality of reference marks, and positions of the plurality of objects relative to the control panel;
- wherein the positions of the plurality of objects relative to the control panel are known.

* * * * *